(12) United States Patent
Wen et al.

(10) Patent No.: US 9,936,129 B2
(45) Date of Patent: Apr. 3, 2018

(54) GENERATING HIGH RESOLUTION IMAGES

(71) Applicant: OBSIDIAN SENSORS, INC., La Jolla, CA (US)

(72) Inventors: Bing Wen, Poway, CA (US); Edward Chan, San Diego, CA (US); Shen-Ge Wang, Santa Clara, CA (US); Jian Ma, San Diego, CA (US); John Hong, San Clemente, CA (US)

(73) Assignee: OBSIDIAN SENSORS, INC., La Jolla, CA (US)

( * ) Notice: Subject to any disclaimer, the term of this patent is extended or adjusted under 35 U.S.C. 154(b) by 0 days.

(21) Appl. No.: 15/183,528

(22) Filed: Jun. 15, 2016

(65) Prior Publication Data

US 2017/0366747 A1 Dec. 21, 2017

(51) Int. Cl.
*H04N 5/232* (2006.01)
*H04N 5/225* (2006.01)
*H04N 5/262* (2006.01)

(52) U.S. Cl.
CPC ....... *H04N 5/23232* (2013.01); *H04N 5/2258* (2013.01); *H04N 5/2621* (2013.01)

(58) Field of Classification Search
CPC . H04N 5/23232; H04N 5/2621; H04N 5/2258
See application file for complete search history.

(56) References Cited

U.S. PATENT DOCUMENTS

| | | | |
|---|---|---|---|
| 6,624,003 B1 | 9/2003 | Rice | |
| 7,456,380 B2 | 11/2008 | McGrath et al. | |
| 9,056,763 B2 | 6/2015 | Geissler | |
| 9,247,220 B2 * | 1/2016 | Yatsuri | H04N 5/23212 |
| 2007/0076099 A1 * | 4/2007 | Eshed | H04N 5/23232 348/218.1 |
| 2007/0133903 A1 * | 6/2007 | Zomet | G06T 3/4053 382/299 |
| 2008/0174670 A1 | 7/2008 | Olsen et al. | |
| 2009/0268983 A1 | 10/2009 | Stone et al. | |
| 2011/0267510 A1 * | 11/2011 | Malone | H01L 27/14625 348/262 |
| 2012/0224085 A1 * | 9/2012 | Al-Salem | G06T 3/4053 348/239 |
| 2013/0038691 A1 | 2/2013 | Agranov et al. | |

(Continued)

OTHER PUBLICATIONS

Lin, et al., "Fundamental Limits of Reconstruction-Based Super-resolution Algorithms under Local Translation,", IEEE Transactions on Pattern Analysis and Machine Intelligence, vol. 26, No. 1, Jan. 2004, pp. 83-97.

(Continued)

*Primary Examiner* — Timothy J Henn
(74) *Attorney, Agent, or Firm* — Morrison & Foerster LLP

(57) ABSTRACT

Techniques are disclosed for generating a high resolution image from a plurality of images captured from a plurality of sensors. The pixels in one sensor have at least one of different size, shape, or orientation than pixels in another sensor. The difference in size, shape, or orientation of the pixels and the interconnection of pixels on respective sensors provides a high level of certainty that there will be sufficient difference in the captured images, with limited loss in image content, to generate a relatively high resolution image from the images captured by the respective sensors.

19 Claims, 8 Drawing Sheets

(56) References Cited

U.S. PATENT DOCUMENTS

| | | | |
|---|---|---|---|
| 2013/0078753 A1 | 3/2013 | Hayes | |
| 2013/0140655 A1 | 6/2013 | Yeh | |
| 2014/0111650 A1 | 4/2014 | Georgiev et al. | |
| 2014/0118584 A1* | 5/2014 | Lee | H04N 5/2254 348/262 |
| 2015/0022643 A1 | 1/2015 | Stetson et al. | |
| 2015/0085174 A1* | 3/2015 | Shabtay | H04N 5/23296 348/336 |
| 2015/0091167 A1 | 4/2015 | Geissler | |
| 2016/0214857 A1 | 7/2016 | Lin | |
| 2017/0111589 A1* | 4/2017 | Park | H04N 5/23296 |
| 2017/0187933 A1* | 6/2017 | Duparre | H04N 5/2254 |

OTHER PUBLICATIONS

Farsiu, et al., "Fast and Robust Multiframe Super Resolution," IEEE Transactions on Image Processing, vol. 13, No. 10, Oct. 2004, pp. 1327-1344.

Alldrin, "Super-Resolution," University of California, Feb. 2006. [Online]. Available: http://vision.ucsd.edu/~nalldrin/research/superresolution/superresolution.pdf., 11 pp.

Mitzel, "Video Super Resolution using Duality Based TV-L1 optical flow," in Pattern Recognition, Springer Berlin Heidelberg, Sep. 2009, pp. 432-441.

Fujimori, "Super-resolution reconstruction algorithm using vibro-imaging and correlation image sensor," in Proceedings of SICE Annual Conference (SICE), Akita, Aug. 20-23, 2012, 6 pp.

"Olympus OM-D E-M5 II Review," Olympus, [Online]. Mar. 18, 2015, Available: http://www.dpreview.com/reviews/olympus-om-d-e-m5-ii/4, 5 pp.

Portnoy, et al., "Thin Digital Imaging Systems Using Focal Plane Coding", SPIE Feb. 2006, https://users.cs.duke.edu/~nikos/reprints/C-014-ThinFPC-SPIE2006.pdf, 8 pp.

Ben-Ezra et al., "Penrose Pixels for Super-Resolution," IEEE Transactions on Pattern Analysis and Machine Intelligence (2011) 33(7):1370-1383.

International Search Report and Written Opinion for PCT/US2017/031166, dated Aug. 23, 2017, 15 pages.

Shi et al., "Sub-Pixel Layout for Super-Resolution with Images in the Octic Group," in: Network and Parallel Computing, Springer International Publishing (2014) vol. 8689, pp. 250-264.

* cited by examiner

GENERATING HIGH RESOLUTION IMAGES

TECHNICAL FIELD

This disclosure relates to image generation and more particularly to image generation from a plurality of sensors.

BACKGROUND

An example of a way to generate a higher resolution image is to combine multiple lower resolution images captured by two or more lower resolution sensors, where each sensor includes a plurality of pixels. The combination of the outputs of respective pixels from respective lower resolution sensors results in the higher resolution image. Between the regions captured by each of the pixels, there may be some overlap in the content, and the overlap content as well as the content that is different from the pixels can together be used to generate the higher resolution image.

SUMMARY

This disclosure describes example ways of arranging pixels so that there is guaranteed to be differences in the content captured by respective pixels of the sensors. As one example, the shape, size, and/or orientation of pixels on a first sensor are different than the shape, size, and/or orientation of pixels of a second sensor. The first and second sensor may be relatively low resolution sensors. The difference in the shape, size, and/or orientation of pixels may ensure that there is sufficient difference in the captured image content from the first and second sensors to generate high quality, higher resolution images from the images captured by the first and second sensors.

In one example, the disclosure describes a method of image processing, the method comprising generating pixel data for a first image from image content captured by a plurality of pixels of a first sensor, wherein the plurality of pixels of the first sensor includes a first pixel, generating pixel data for a second image from image content captured by a plurality of pixels of a second sensor, wherein the plurality of pixels of the second sensor includes a second pixel, wherein the second pixel is located in a same relative position in the plurality of pixels of the second senor as the first pixel in the plurality of pixels of the first sensor, and wherein the first pixel differs from the second pixel in at least one of shape, size, or orientation, processing the pixel data for the first image to construct the first image, and processing the pixel data for the second image to construct the second image.

In one example, the disclosure describes a device for image processing, the device comprising a first sensor comprising a plurality of pixels, the first sensor configured to generate pixel data for a first image from image content captured by the plurality of pixels of the first sensor, wherein the plurality of pixels of the first sensor includes a first pixel, a second sensor comprising a plurality of pixels, the second sensor configured to generate pixel data for a second image from image content captured by the plurality of pixels of the second sensor, wherein the plurality of pixels of the second sensor includes a second pixel, wherein the second pixel is located in a same relative position in the plurality of pixels of the second senor as the first pixel in the plurality of pixels of the first sensor, and wherein the first pixel differs from the second pixel in at least one of shape, size, or orientation, and one or more sensor processors. The one or more sensor processors are configured to process the pixel data for the first image to construct the first image, and process the pixel data for the second image to construct the second image.

In one example, the disclosure describes a device for image processing, the device comprising a first means for generating pixel data for a first image from image content captured by a plurality of pixels of the first means for generating, wherein the plurality of pixels of the first means for generating includes a first pixel, a second means for generating pixel data for a second image from image content captured by a plurality of pixels of the second means for generating, wherein the plurality of pixels of the second means for generating includes a second pixel, wherein the second pixel is located in a same relative position in the plurality of pixels of the second means for generating as the first pixel in the plurality of pixels of the first means for generating, and wherein the first pixel differs from the second pixel in at least one of shape, size, or orientation, means for processing the pixel data for the first image to construct the first image, and means for processing the pixel data for the second image to construct the second image.

In one example, the disclosure describes a computer-readable storage medium having instructions stored thereon that when executed cause one or more processors of a device for image processing to generate pixel data for a first image from image content captured by a plurality of pixels of a first sensor, wherein the plurality of pixels of the first sensor includes a first pixel, generate pixel data for a second image from image content captured by a plurality of pixels of a second sensor, wherein the plurality of pixels of the second sensor includes a second pixel, wherein the second pixel is located in a same relative position in the plurality of pixels of the second senor as the first pixel in the plurality of pixels of the first sensor, and wherein the first pixel differs from the second pixel in at least one of shape, size, or orientation, process the pixel data for the first image to construct the first image, and process the pixel data for the second image to construct the second image.

The details of one or more examples are set forth in the accompanying drawings and the description below. Other features, objects, and advantages will be apparent from the description, drawings, and claims.

DETAILED DESCRIPTION

Figure 1:
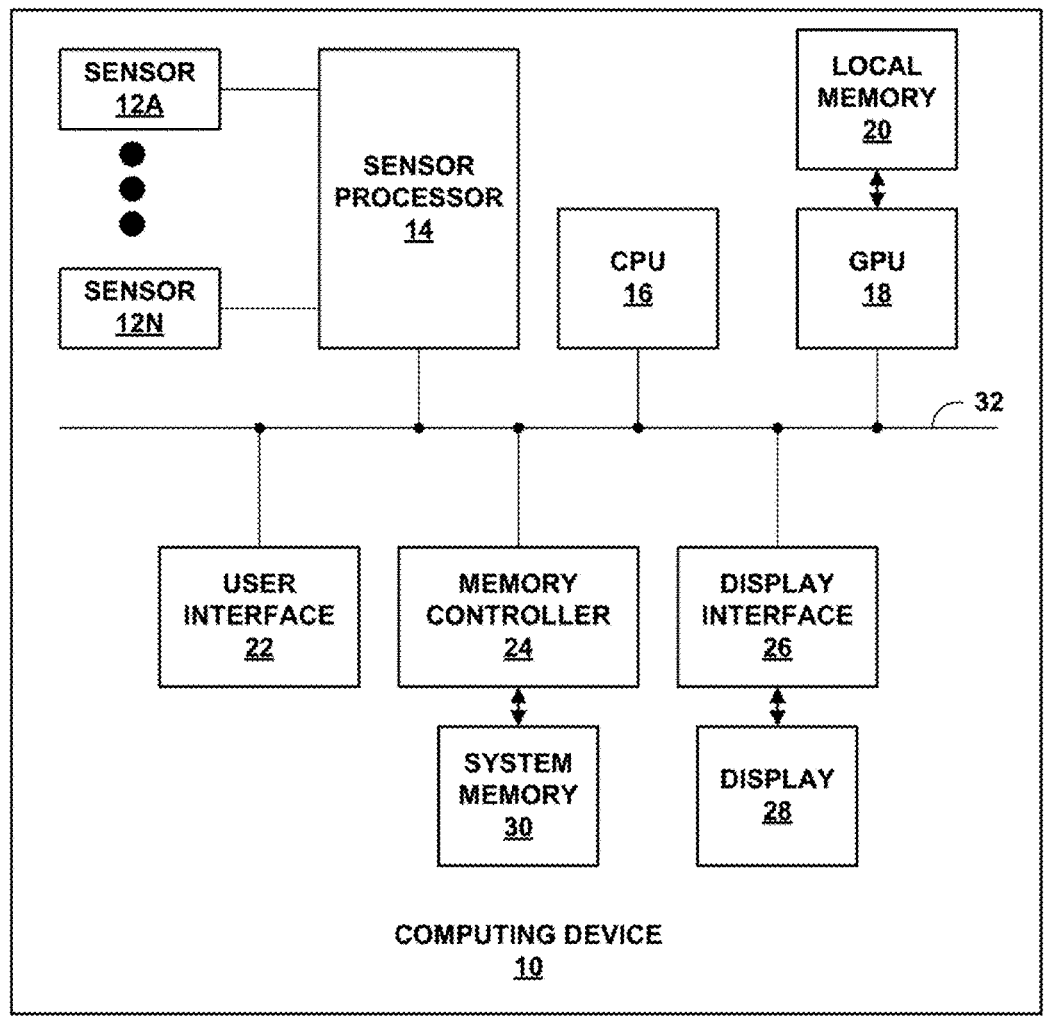
FIG. 1 is a block diagram of a device for image processing configured to perform one or more example techniques described in this disclosure.

The angular resolution of a sensor is a ratio of pixel size (p) and focal length (f) (e.g., resolution=p/f). In mobile devices, the focal length is ordinarily kept constant because the device thickness cannot be changed or is difficult or undesirable to change. In particular, it may be undesirable to make a mobile device larger in size or thickness. Also, there may be difficulties in further shrinking the pixel size. Therefore, standard ways to improve angular resolution, such as reducing pixel size or increasing focal length, may not be available.

One way of increasing angular resolution (e.g., generating a high resolution image) is to combine the outputs of multiple low resolution images into a higher resolution image. For example, a device includes a plurality of sensors and each sensor includes a plurality of pixels to capture photons. As used in this disclosure, a sensor refers to a set of pixels that capture image content from which a complete image is generated. Each of the plurality of sensors may include its own respective aperture. However, in some examples, there may be one aperture and an optical waveguide that spreads the image content received via the aperture to pixels of respective sensors.

To generate the high resolution image, an image pixel in the high resolution image is generated from the combination image pixels from lower resolution images. The image pixels from the lower resolution images may correspond to the outputs of respective pixels from respective low resolution sensors. One pixel of a low resolution sensor may capture content that corresponds to a number N of image pixels (N>1 and possibly fractional) of the high resolution image. Between the regions captured by each of the pixels, there may be some overlap in the content, and the overlapped content as well as the content that is different from the pixels can together be used to generate the high resolution image. However, if the content captured by the pixels of the low resolution sensors is substantially the same, then there are insufficient differences in the captured content to generate the high resolution content.

This disclosure describes pixels of different sensors, where pixels in different sensors are arranged such that the content captured by the different sensors is not exactly the same. More generally, the arrangement of the pixels in the different sensors may be such that image content captured by corresponding pixels in the different sensors is not exactly the same. Corresponding pixels in the different sensors means pixels in different sensors having the same relative position. For instance, the arrangement of the top-left pixel of a first sensor is different than the arrangement of the top-left pixel of a second sensor, the arrangement of the pixel to the right of the top-left pixel of the first sensor is different than the arrangement of the pixel to the right of the top-left pixel of the second sensor, and so forth.

The pixels having different arrangement means that at least one of the shape, size, or orientation of a pixel in one sensor is different than the shape, size, or orientation of a corresponding pixel in any of the other sensors. As one example, the difference in orientation of corresponding pixels refers to different rotations of corresponding pixels (e.g., different rotations along optical axes or normal of the sensors). In some examples, the pixels in each of the sensors may be interconnected so that there is no gap between the pixels, and the pixels may not include any mask that blocks the ability of the pixel to receive light. Accordingly, each of the sensors may capture the entire image content. However, the differences in the shape, size, or orientation ensures difference in coverage areas by corresponding pixels allows for sufficient differences in image content per pixel to allow the images to be combined to generate a higher resolution image. For example, some portions of a pixel of the first sensor and a corresponding pixel of the second sensor would cover the same spatial areas of the image content, but other portions of the pixel of the first sensor and the corresponding pixel of the second sensor would capture different spatial areas of the image content, thereby resulting in differences in the spatial areas in which light is captured by the pixels of the first and second sensors.

Pixels of different sensors having different size, shape, or orientation means that if a pixel from the first sensor were overlaid on top of a pixel from the second sensor such that the centers of the two pixels overlapped, the area that would be covered by one pixel would be different than the area covered by another pixel. As an example, a pixel in one sensor is a square pixel with one corner missing (e.g., L-shaped), such that the pixel forms a pixel having six corner points, instead of four corner points. Considered another way, assume a square pixel is divided into four equal portions (e.g., quadrants), and then one of the portions is removed such that the removed portion does not contribute to the light captured by the pixel. The resulting pixel will be L-shaped and will have six corner points. This type of pixel in a first sensor and a corresponding pixel in a second sensor will have different coverage areas, if the pixels are rotated (e.g., rotated along optical axes or normals of the sensors) relative to one another at a particular angle (e.g., any angle other than 360 degrees), such that the pixels have less than full overlap with one another. It should be understood that the above is merely one example and should in no way be considered limiting. The above example is provided merely to ease with understanding.

In one example, the pixels in a first sensor may be arranged in a first orientation where this so-called removed portion is located in the top-left of the pixel (e.g., first portion of the pixels). The pixels in the a second sensor may be arranged in a second orientation where the removed portion is located in an area other than the top-left, such as, for example, the top-right, bottom-right, or bottom left (e.g., second portion of the pixels), and for an example where there are third and fourth sensors, the pixels are in a third and fourth orientation, respectively, where the removed portion is located in the bottom-left and bottom-right, respectively (e.g., third and fourth portions, respectively). In this example, the first, second, third, and fourth portions are different portions (e.g., different quadrants).

In the above example, the pixels in the each of the sensors will capture photons (e.g., from visible light, infra-red, etc.). However, the image content captured by the pixels in any sensor will have a portion missing relative to the pixels in the other sensors. The content captured by any pixel is based on the size, shape, and/or orientation of the pixel. In the above example, because the orientation of the pixel is different in each of the sensors, the content captured by corresponding pixels in the different sensors will be different.

As described above, to generate high resolution images from a plurality of images, there should be some overlap in the image content and some differences in the image content captured by the respective pixels. With the example techniques described in this disclosure, there is a high level of certainty that there will be differences in the image content captured by corresponding pixels in each of the sensors, due to differences in size, shape, and/or orientation among corresponding pixels in the different sensors. Accordingly, the resulting high resolution image may be of better quality than some other techniques where pixels having the same size, shape, and orientation are used. For instance, the techniques described in this disclosure allow for a greater increase in the resolution of image as compared to other techniques where asymmetric pixels are not used.

FIG. 1 is a block diagram of a device for image processing configured to perform one or more example techniques described in this disclosure. Examples of device 10 include a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a tablet computer, a personal music player, a video player, a display device, a sensor or camera device, a television, a television set-top box, a server, an intermediate network device, a mainframe computer or any other type of device that processes and/or displays graphical data.

As illustrated in the example of FIG. 1, device 10 includes a plurality of sensors 12A-12N (e.g., four sensors or nine sensors as two examples), at least one sensor processor 14, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28.

Also, although the various components are illustrated as separate components, in some examples, the components may be combined to form a system on chip (SoC). As an example, sensor processor 14, CPU 16, GPU 18, and display interface 26 may be formed on a common chip. In some examples, one or more of sensor processor 14, CPU 16, GPU 18, and display interface 26 may be in separate chips.

The various components illustrated in FIG. 1 may be formed in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

As illustrated, device 10 includes sensors 12A-12N. Sensors 12A-12N need not necessarily be part of device 10 and may be external to device 10. In such examples, sensor processor 14 may similarly be external to device 10; however, it may be possible for sensor processor 14 to be internal to device 10 in such examples. For ease of description, the examples are described with respect to sensors 12A-12N and sensor processor 14 being part of device 10 (e.g., such as in examples where device 10 is a mobile device).

Sensors 12A-12N as used in this disclosure refer to separate sets of pixels (e.g., sensor 12A includes a first set of pixels, sensor 12B includes a second set of pixels, and so forth). For example, each sensor includes three pixels (e.g., a pixel for red, a pixel for green, and a pixel for blue). As another example, each sensor includes four pixels (e.g., a pixel for red, two pixels for green used to determine the green intensity and overall luminance, and a pixel for blue, as arranged with a Bayer filter). The techniques described in this disclosure are applicable to all of these examples.

Each of sensors 12A-12N may capture image content to generate one image. Each one of these images may be combined to generate a higher resolution image. However, in some examples, there may be sufficient resolution from any one of the images captured by sensors 12A-12N for display.

Each one of sensors 12A-12N may include its own aperture and lens. However, the techniques are not so limited. In some examples, there may be a common aperture and/or lens for sensors 12A-12N and an optical splitter and waveguide that transmits the captured light to respective ones of 12A-12N. Other configurations are possible and contemplated by the techniques described in this disclosure.

The pixels of sensors 12A-12N should not be confused with image pixels. Image pixel is the term used to define a single "dot" on the generated image from the content captured by sensors 12A-12N. For example, the image generated based on the content captured by any one of sensors 12A-12N includes a set number of pixels (e.g., megapixels). It is possible for the final image to include more pixels by interpolation.

However, the pixels of sensors 12A-12N are the actual photosensor elements (e.g., photodiodes) having photoconductivity (e.g., the elements that capture light particles in the viewing spectrum or outside the viewing spectrum). The pixels of sensors 12A-12N conduct electricity based on intensity of the light energy (e.g., infrared or visible light) striking the surface of the pixels. The pixels may be formed with germanium, gallium, selenium, silicon with dopants, or certain metal oxides and sulfides, as a few non-limiting examples.

In some examples, the pixels of sensors 12A-12N may be covered with red-green-blue (RGB) color filters in accordance with a Bayer filter. With Bayer filtering, each of the pixel may receive light energy for a particular color component (e.g., red, green, or blue). Accordingly, the current generated by each pixel is indicative of the intensity of red, green, or blue color components in the captured light.

In examples where sensors 12A-12N are used for infrared detection or for purposes other than generating real-life actual image or video content, Bayer filtering may not be used. For such cases, other filtering or possibly no filtering is used. For higher sensitivity, no filtering may be used in infrared detection.

Sensor processor 14 is configured to receive the electrical currents from respective pixels of sensors 12A-12N and process the electrical currents to generate an image. Although one sensor processor 14 is illustrated, in some examples, there may be a plurality of sensor processors (e.g., one per sensors 12A-12N). Accordingly, in some examples, there may be one or more sensor processors like sensor processor 14 in device 10.

In some examples, sensor processor 14 may be configured as a single-input-multiple-data (SIMD) architecture. Sensor processor 14 may perform the same operations on current received from each of the pixels on each of sensors 12A-12N. Each lane of the SIMD architecture includes an image pipeline. The image pipeline includes hardwire circuitry and/or programmable circuitry to process the output of the pixels.

For example, each image pipeline sensor processor 14 may include respective trans-impedance amplifiers (TIAs) to convert the current to a voltage and respective analog-to-digital converters (ADCs) that convert the analog voltage output into a digital value. In the example of the visible spectrum, because the current outputted by each pixel indicates the intensity of a red, green, or blue component, the digital values from three pixels of one of sensors 12A-12N (e.g., digital values from one sensor that includes three or four pixels) can be used to generate one image pixel.

In addition to converting analog current outputs to digital values, sensor processor 14 may perform some additional post-processing to increase the quality of the final image. For example, sensor processor 14 may evaluate the color and brightness data of neighboring image pixels and perform demosaicing to update the color and brightness of the image pixel. Sensor processor 14 may also perform noise reduction and image sharpening, as additional examples.

Sensor processor 14 outputs the resulting images (e.g., pixel values for each of the image pixels) to system memory 30 via memory controller 24. As described in more detail, each of the images may be combined together to form a higher resolution image (e.g., an image having more image pixels than the number of image pixels of any of the images captured by sensors 12A-12N). For example, GPU 18 or some other processing unit of computing device 10, such as sensor processor 14 itself, may generate the high resolution image. In some examples, a device other than computing device 10 may receive the images (e.g., via a bus, wired network, or wireless network, or combination thereof), and generate the high resolution image. In general, processing circuitry may be configured to generate the high resolution image, and non-limiting examples of such processing circuitry includes GPU 18, sensor processor 14, or a device other than computing device 10. In some cases, sensor processor 14 may combine the images and generate the high resolution image in real-time. In such examples, sensor processor 14 may store the lower resolution images in local memory and generate the high resolution image by retrieving the lower resolution images from the local memory; however, storage and retrieval from system memory 30 may be possible as well for real-time high resolution image generation.

CPU 16 may comprise a general-purpose or a special-purpose processor that controls operation of device 10. A user may provide input to computing device 10 to cause CPU 16 to execute one or more software applications. The software applications that execute on CPU 16 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user input interface 22.

As one example, the user may execute an application that is configured to control capture of images. The application may present real-time image content on display 28 for the user to view prior to taking an image. In some examples, the real-time image content displayed on display 28 may be the content from one of sensors 12A-12N. The software code for the application used to capture images may be stored on system memory 30 and CPU 16 may retrieve and execute the object code for the application or retrieve and compile source code to execute the resulting object code.

When the user is satisfied with the real-time image content, the user may interact with user interface 22 (which may be a graphical button displayed on display 28) to capture the image content. In response, one or more sensors 12A-12N may capture image content substantially simultaneously and sensor processor 14 may process the received image content to generate a plurality of images. In some examples, rather than sensors 12A-12N capturing images in all cases, the application executing on CPU 16 may output via display 28 an option for the user to select high resolution image generation. In response, two or more, and possibly all, of sensors 12A-12N would capture images, and if not selected, only one of sensors 12A-12N captures image content. In some examples, the user may be provided options to selectively combine two, three, four or more sensors based on the desired resolution and may be provided with an option of which specific sensors should capture the image content.

Alternatively, all sensors 12A-12N may capture images in all instances. However, sensor processor 14 may not process the resulting content from all sensors 12A-12N in all instances. If the user selected high resolution image generation, then sensor processor 14 may process the output from all sensors 12A-12N, and if the user does not select high resolution image generation, then sensor processor 14 may process the output of one of sensors 12A-12N. If the user selected a certain resolution, sensor processor 14 may process the output of some, but not all, of sensors 12A-12N to provide the selected resolution.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example computing device 10 of FIG. 1 as being a processing module that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by sensor processor 14, CPU 16, and GPU 18. For example, system memory 30 may store user applications, resulting images from sensor processor 14, etc. System memory 30 may additionally store information for use by and/or generated by other components of computing device 10. For example, system memory 30 may act as a device memory for sensor processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause sensor processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., sensor processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from device 10, and moved to another device. As another example, memory, substantially similar to system memory 30, may be inserted into device 10. In certain examples, a non-transitory storage medium may store data that can, over time, change (e.g., in RAM).

Sensor processor 14, CPU 16, and GPU 18 may store image data, and the like in respective buffers that is allocated within system memory 30. Display interface 26 may retrieve the data from system memory 30 and configure display 28 to display the image represented by the rendered image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

As described above, this disclosure describes example techniques to generate a relatively high resolution image. One example way to generate such a high resolution image is to decrease the size of pixels on a sensor (e.g., decrease size of pixel if there were only one of sensors 12A-12N) and/or increase thickness between lens and pixels to change the focal length. However, there may be a practical limit to how far pixel sizes can be reduced. Also, the thickness of device 10 may be set, and therefore, it may not be possible or desirable to increase thickness between the lens and pixels to change the focal length. In particular, it may be undesirable to make a mobile device larger in size or thickness.

Accordingly, this disclosure describes a plurality of sensors 12A-12N that each capture an image, and the resulting images can be combined to produce a higher resolution image. The various components illustrated in device 10 may be configured to combine the images captured by sensors 12A-12N. However, because combining the images includes matrix multiplication, as described below, processing units with parallel processing capabilities (e.g., performing many tasks in parallel) may be better suited for combining the images as compared to other units. For example, sensor processor 14, GPU 18, and display interface 26 with their respective SIMD architecture may be better suited to perform matrix operations as compared to CPU 16; however, CPU 16 may perform the operations as well. In some examples, device 10 may transmit the images to another device that performs the matrix operations to generate a higher resolution image.

This disclosure uses the term "processing circuit" to refer to the various units that may perform the techniques to combine the images. Examples of the processing circuit include sensor processor 14, GPU 18, CPU 16, display interface 26, or a device external to device 10. The processing circuit may comprise a fixed function or programmable processing circuit, or a combination of fixed function and programmable processing circuits.

The equation to combine images to form a high resolution image is $Rx=I$, where I represents the images captured by sensors 12A-12N and processed by sensor processor 14, R is the system response matrix, and x is the resulting higher resolution image. The R matrix is a compensation matrix that is generated at the manufacturer. However, the degeneracy of the R matrix causes a fundamental limit on resolution of magnification factor (approximately 1.6× magnification). The 1.6× resolution magnification is in linear dimension, which means that there are actual $1.6^2$ (e.g., approximately 2.5×) number of image pixels. For standard pixels of sensors 12A-12N, the best resolution that is available is 1.6 times the resolution of any image generated by sensors 12A-12N (limit is 2.5× number of image pixels).

There may be two types of degeneracy. In the first type of degeneracy, degeneracy is from the shifting of image pixels from the images captured by sensors 12A-12N along the high resolution image.

The second type of degeneracy is due to there being too much overlap between the image content captured by corresponding pixels of different sensors 12A-12N (e.g., pixels having same location in relative sensors). To generate high resolution image, there should be some overlap in the image content captured by pixels of sensors 12A-12N and some differences in the image content captured by pixels of sensors 12A-12N. If there is little to no difference in the image content captured by pixels of sensors 12A-12N, then there is insufficient new (e.g., different) information from each of the generated images to produce a high quality, high resolution image.

Although the pixels in sensors 12A-12N have some natural separation simply due to the location of sensors 12A-12N, such separation may be insufficient to ensure that there are enough differences in the image content captured by the different sensors 12A-12N. In some cases, sensors 12A-12N cannot be aligned accurately. Also, the lens distortion may move around the light that each pixel receives. For example, the lens distortion may bend or shift the incoming light such that there is no difference in the light received by pixels of sensors 12A-12N. The problem in either case (e.g., poor sensor alignment or lens distortion) is that the image pixels in an image have very similar values as corresponding image pixels in other images.

As an example, assume that there are four sensors 12. In this example, if the image pixels in each of four images generated from the content captured by each of the four sensors 12 is the same, then generating higher resolution content may not yield a robust image. The cause for why the image pixels are the same may be due to misalignment of the four sensors 12 and/or lens distortion.

The image content that is captured by the four sensors 12 is the same image content (e.g., the same object). For instance, the light is spread to all four sensors 12. One way to attempt to have differences in the image content captured by corresponding pixels is to shift the alignment of pixels in respective sensors 12 (e.g., half a pixel shift or 0.5 pixel shift). While having such separation should ensure that there is sufficient difference in the captured image content by the corresponding pixels to generate a high quality higher resolution image, manufacturing processes may not be sufficiently accurate to guarantee the shifts. For instance, it may be possible that rather than having 0.5 pixel shift, the pixel shift is only 0.1, which would then not provide sufficient difference in the captured image content to generate a high quality higher resolution image. Also, even if the shift is accurate, the spreading of the light to sensors 12A-12D may not be accurate. For instance, the spreading may cause the light to shift (e.g., due to lens distortion) which could then end up aligning the image content on the pixels. As an example, if the shift between pixels of different sensors 12 is half a pixel, and the lens distortion causes the light received by sensor 12B to be shifted by half a pixel, then there will be no difference in the image content captured by pixels of sensor 12A and pixels of sensor 12B.

Figure 2A:
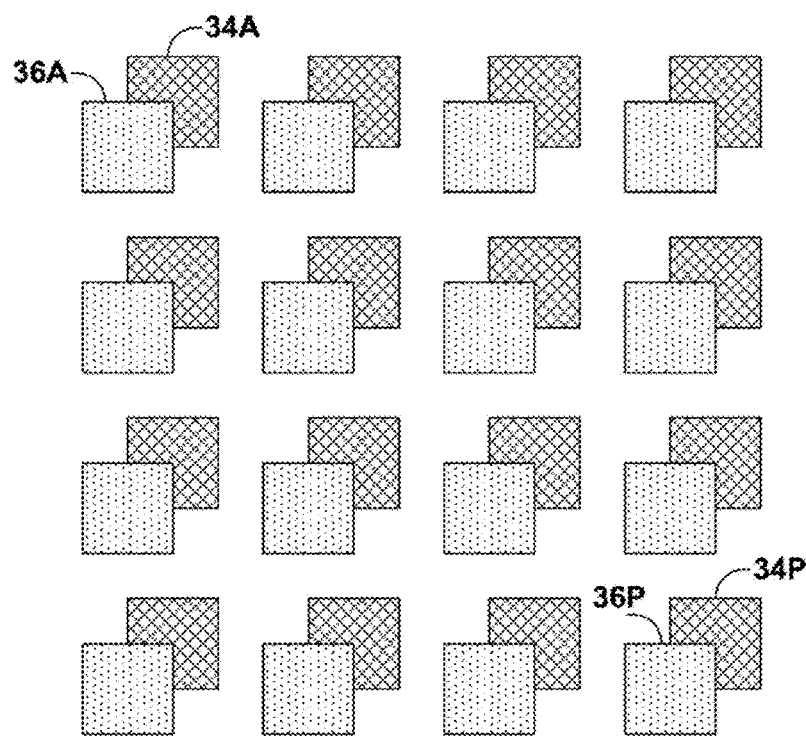
FIGS. 2A and 2B are conceptual diagrams illustrating comparison of overlap between image pixels from images generated from two different sensors.
Figure 2B:
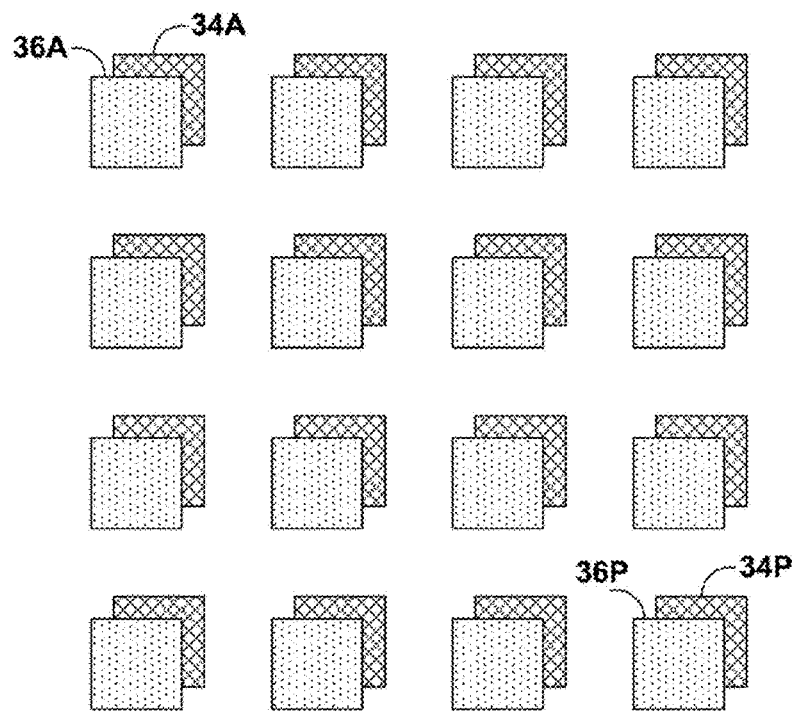

FIGS. 2A and 2B are conceptual diagrams illustrating comparison between overlap between image pixels from images generated from two different sensors. FIGS. 2A and 2B illustrate image pixels 34A-34P, which represents the image pixels generated from a first sensor, and image pixels 36A-36P, which represents the image pixels generated from a second sensor.

Image pixels 34A-34P represent the image content of particular region captured by the first sensor. Image pixels 36A-36P represent the image content of particular region captured by the second sensor. To generate high quality, higher resolution images, there should be differences in the particular regions captured by respective pixels so that there are sufficient differences in the image content that can be used to generate the higher resolution image. However, misalignment of the sensors or lens distortion may cause the corresponding pixels of the two sensors to capture the same content.

In the example illustrated in FIG. 2A, there is some overlap in the region captured by corresponding pixels in the first sensor and the second sensor, but there is sufficient difference in the regions as well. For example, there is some overlap between image pixel 34A and 36A but there is more difference. Similarly, there is some overlap between image pixel 34B and 36B but there is more difference, and so forth.

In the example illustrated in FIG. 2B, there is much more overlap in the region captured by corresponding pixels in the first sensor and second sensor. In cases of a high degree of overlap, there may be insufficient difference in the region represented by image pixel 34A and the region represented by 36A, insufficient difference in the region represented by the next image pixel 34B and 36B, and so forth.

If the images captured by the first and second sensors in the example illustrated in FIG. 2A were used to generate a high resolution image, the quality of the high resolution image would be better than if the images captured by the first and second sensors in the example illustrated in FIG. 2B were used. This is because there is more difference in the image content of the image pixels 34 and 36 for the example illustrated in FIG. 2A than for the example illustrated in FIG. 2B, resulting in there being more difference that can be used to add detail to the high resolution image, increasing the quality of the high resolution image.

This disclosure describes example ways to increase the likelihood that there will be differences in the content of corresponding image pixels generated from processing the image content captured by sensors 12A-12N. To ensure there are differences, this disclosure describes pixels of sensors 12A-12N having different coverage areas (e.g., due to different size, shape, and/or orientation of the pixels), thereby promoting differences in the contact captured by sensors 12A-12N.

The coverage of corresponding pixels for sensors 12A-12N being different means that the image content region that would be captured by a pixel of sensor 12A is different than the image content region that would be captured by a corresponding pixel of sensor 12B (e.g., pixel located in the same relative position on sensor 12B). One way to ensure that the coverage areas of the pixels are different so that different regions are captured is to have pixels in sensor 12A be asymmetric with respect to corresponding pixels in the other sensors 12B-12N, and be oriented to generate differences in coverage area. For example, if a pixel from sensor 12A were placed next to a pixel from any of sensors 12B-12N, and oriented differently, the two pixels would not be identical to one another, and hence, asymmetrical in terms of their coverage areas. Accordingly, the pixels in sensors 12A-12N may be considered as asymmetrical pixels.

In some examples, the pixels may have the same size, but the shape and/or orientation may be different to facilitate different coverage areas. In some examples, the pixels may have the same shape, but the size and/or orientation may be different to facilitate different coverage areas. In some examples, the pixels may have the same orientation, but the size and/or shape may be different to facilitate different coverage areas. In some examples, the pixels have may different size, shape, and orientation to facilitate different coverage areas.

Because the coverage area of the pixels is different, even if there is misalignment of sensors 12A-12N or there is lens distortion causing pixels of sensors 12A-12N to capture generally the same coverage area of content, the actual region of content captured by corresponding pixels of sensors 12A-12N would be different. In this way, the degeneracy issue described above for the case where the size, shape, and orientation for all pixels in sensors 12A-12N are the same may be reduced.

In one or more examples, sensor processor 14 may be configured to generate pixel data for a first image from image content captured by a plurality of pixels of a first sensor of sensors 12A-12N, and generate pixel data for a second image from image content captured by a plurality of pixels of a second sensor of sensors 12A-12N. The image pixel data may be current outputted by each respective pixel indicative of the intensity of the light received by the pixels.

The coverage area of pixels of the first sensor is different than the coverage area of pixels of the second sensor. For example, while the image content captured by the plurality of pixels of the first sensor and the image content captured by the plurality of pixels of the second sensor is the same image content, at least one of shape, size, or orientation of the pixels of the first sensor is different than shape, size or orientation of corresponding pixels of the second sensor. As described in more detail, the pixels of the first sensor may be interconnected such that the pixels capture the entire image content, and the pixels of the second sensor may be interconnected such that the pixels capture the entire image content. Therefore, the image content that is captured may be of the same content (e.g., same object), but the image content captured by corresponding pixels of respective sensors 12A-12N may be different. For example, the total image content captured by each of sensors 12A-12N may be of the same object, but on a per-corresponding pixel basis of pixels in different sensors, the image content may be slightly different. There is some overlap in the image content captured by each of the corresponding pixels in different sensors 12A-12N and some differences in the image content captured by each of the corresponding pixels in different sensors 12A-12N.

Sensor processor 14 processes the image pixel data for the first image to construct the first image, and processes the image pixel data for the second image to construct the second image. For example, sensor processor 14 includes fixed-function circuitry or programmable circuitry, or a combination of both, to convert the current received from respective pixels of sensors 12A-12N into image pixel values of the first and second images. For instance, sensor processor 14 includes respective TIAs and ADCs that convert the current from respective pixels of sensors 12A-12N into digital values. Sensor processor 14 may also include demosaic circuit block, a noise filter circuit block, and an image sharpening circuit block that generate the image pixel values for the first image and the second image to construct the first image and the second image.

Although the above example is described with two sensors of sensors 12A-12N, the example techniques are not so limited and there may be more than two sensors (e.g., four sensors or nine sensors). In general, sensor processor 14 may be configured to generate image pixel data for a plurality of additional images from image content captured by a plurality of pixels of respective sensors 12A-12N from a plurality of additional sensors 12A-12N. The coverage areas of pixels in each of the additional sensors 12A-12N may be different than the coverage areas of corresponding pixels in any of the other sensors 12A-12N. Sensor processor 14 may process the image pixel data from the plurality of additional images to construct the plurality of additional images.

Sensor processor 14 may store the constructed images (e.g., images for which sensor processor 14 has determined the image pixel values) in system memory 30. A processing circuit (e.g., sensor processor 14, GPU 18, or display interface 26 or a device external to device 10, as a few non-limiting examples) may retrieve the images from system memory 30 or via transmission from device 10 to this other device. The processing circuit may generate a high resolution image based at least on the first image and the second image, and possibly two or more images (e.g., three or four images). The high resolution image includes more image pixels than the first image and the second image (e.g., more than 2.5 times a number of image pixels in the first image or the second image). As described above, 1.6× resolution magnification is linear dimension, and the number additional image pixels is approximately $1.6^2$ or approximately 2.5.

By having pixels with different coverage area (e.g., different size, shape, and/or orientation), the R matrix generated at the manufacturer tends to be immune to degeneracy and not affected by alignment issues. The R matrix may be determined one time at the manufacturer and stored for subsequent use. The following describes how the R matrix is generated and the issues of degeneracy.

As described above, the equation to determine the high resolution image is Rx=I, where x represents the high resolution image and I represents the input images. Therefore, x equals $R^{-1}I$. However, because of degeneracy issues, determining a matrix R that is invertible may be not be feasible if an increase in resolution of more than 2.5 times (or 1.6 time in one dimension and $1.6^2$ which is 2.5 times in both dimensions) is desired.

The following is one example way for calibration to determine the R matrix. The R matrix describes pixel registration, or optical flow, between different sensors 12A-12N. At the manufacturer, a calibration screen, populated with an array of point sources, is located at a desired distance, z, away from sensors 12A-12N. On the calibration screen, the separation between point sources is Δx. The calibration screen is designed so that Δx/z is the minimal angle to resolve by a high resolution image. For example, each point source represents one image pixel in the high resolution image.

Each time one of the light source k is turned, each one of sensors 12A-12N records its own image. If the light source is a vector $$O = \begin{pmatrix} o_1 \\ o_2 \\ \vdots \\ o_n \end{pmatrix},$$

and the concatenation of all the image pixels of images is a vector $$I = \begin{pmatrix} i_1 \\ i_2 \\ \vdots \\ i_n \end{pmatrix},$$

the output is a linear function of the light source O=RI. Since each time the input is $$I_k = \begin{pmatrix} 0 \\ \vdots \\ 0 \\ 1 \\ 0 \\ \vdots \\ 0 \\ 0 \end{pmatrix},$$

only the $k^{th}$ source is on, the output is the $k^{th}$ column of the R-matrix. Therefore, $O_k = R(:,k)I_k$, where $R(:,k)$ represents a column of matrix R.

The above procedure is repeated until every column of R is determined. Optical flow, which is the pixel registration between sensors 12A-12N, is represented by the columns of R. If the high resolution image is 600×600, and sensors 12A-12N run at 30 fps, the calibration takes at least 3.3 hours, which may be an undesirably long time. However, fast calibration method can be used so that only several images need to be taken. The whole calibration can be finished in seconds.

The following is another example way to generate the R-matrix so that the calibration can be completed in seconds. Matrix R can be measured by taking one or more pictures of known target, and R is reconstructed by solving the equation R=xI. To reduce the number of images required, R can be parameterized based on optics and pixel models. For example, R can be calculated from the point spread function of the optical system, the optical distortion, and the pixel shape. Parameterized R may have few number of unknowns that need to be determined from the above equations. In some cases, the number of unknowns may be small enough that only one calibration image is required. In this case the calibration time can be reduced to several seconds.

The high resolution image can be computed from Rx=I by iteration, or iteration may not be needed if the R matrix can be explicitly inverted. For any image taken by sensors 12A-12N, the result is assembled in a vector I, and the HR (high resolution) image is calculated using $R^{-1}I$. Iteration may be preferred due to small memory or computation requirement. No matter which method is used, to generate a high resolution, R may be invertible. However, in some cases, R may not be invertible. For example, when resolution magnification M=2 (i.e., the image pixels from the sensors 12A-12N capture a region that is twice in size of the region of the image pixels of the high resolution image), and if the high resolution image is a checkboard pattern, the images from sensors 12A-12N may not carry useful information, because they are all uniformly grey. This above example, where sensors 12A-12N may not carry useful information, is applicable to cases where the pixels are the same (e.g., such as square pixels) and not for the examples described in this disclosure where the pixels have different size, shape, and/or orientation.

In a checkboard pattern and where the pixels are square pixels, the image is a black square followed by a white square and so on. However, for this high resolution image, each of the image captured by sensors 12A-12N would only be grey (assuming a 2× magnification). This is because each one of sensors 12A-12N would capture one black square and one white square as a grey square. Therefore, there would be insufficient information to generate the checkboard pattern where pixels having the same size, shape, and orientation are used. This property is reflected in R as singularity, and R may not be inverted.

Because only left inversion of R may be needed, that is, $R^{-1}R=I$, but no requirement on $RR^{-1}$, the requirement may be for R to have full row rank so that it is left invertible. The following describes an example way to construct a full row rank R matrix.

All elements of the R matrix are positive. Each column of R represents sensor response to a calibration light source or a high resolution image pixel. If the sum of elements in a column is very small, the corresponding light source point cannot illuminate pixels of sensors 12A-12N. This column should be removed from R, and the high resolution image pixel should be set to black always.

Each row of R represents a sensor for a low resolution pixel (e.g., image pixel output from each one of sensors 12A-12N). If the sum of a row is small, the image pixel from one of sensors 12A-12N is barely illuminated by any high resolution image pixels. As a result, there may not be usable information, and the row should be removed from the R matrix.

If two rows are identical, these two image pixels output from sensors 12A-12N are sampling the same region of the high resolution image. The following describes how to remove this degeneracy.

After all those rows and columns are removed, R should have more rows than columns, so it can have full row rank. That is to say, the total image pixels from sensors 12A-12N should be at least as many as the high resolution pixels. The example techniques are not reconstructing more information from less information (e.g., as might be done with interpolation). However, using interpolation in addition to the techniques described in this disclosure is possible.

For a 2×2 reconstruction, the angle formed by image pixels from the image generated by sensors 12A-12N should be less than two times the angle between high resolution image pixels. That means, the calibration panel cannot be too far from the device during the calibration for determining the R matrix.

The following describes breaking degeneracy using asymmetric pixel shape (e.g., pixels having different size, shape, and/or orientation in accordance with techniques described in this disclosures). To make sure R is full rank, the pixels of sensors 12A-12N may need to satisfy these conditions. If a pixel on sensors 12A-12N is moved by a distance of a high resolution pixel size, it should generate different output if there is high resolution pixel intensity variation. Also, the sample region of pixels of sensors 12A-12N cannot overlap too much with each other under any translation operation.

Because the first condition is not satisfied, having a magnification of a factor of two using only square pixels for sensors 12A-12N cannot restore the checkboard pattern of the high resolution images. With respect to the second condition, if the image content captured from two corresponding pixels in sensors 12A-12N overlap, matrix R will have two identical rows, so the matrix R may not have full rank any more (e.g., the rank will decrease by one). Even if the image content of the two pixels does not completely overlap, if they overlap too much, the condition number of R becomes worse.

The second condition is satisfied if pixel registration is exact, which may be a requirement for square shaped pixels (e.g., where the size, shape, and orientation is the same). For example, when the image sensor that includes pixels in sensors 12A-12N is shifted by half a pixel in a well-controlled way (as described above), R becomes invertible. However, even with such shift, the result may not satisfy the first condition when the magnification is to be a factor of two.

When combining images generated from sensors 12A-12N into a high resolution image, the second condition becomes difficult to guarantee, because the x-y location of each of sensors 12A-12N cannot be accurately defined, and each one of sensors 12A-12N can have its unique distortion that can cause a shift of the pixels easily by many pixels. This will result in a square shaped pixel overlapping with another square shaped pixel when translated (e.g., as illustrated with the image pixels in FIGS. 2A and 2B).

This disclosure describes example designs of the pixel shape of pixels on sensors 12A-12N so that no matter under what translation operation, the resulting image pixels in the images generated from sensors 12A-12N do not overlap, and the pixels on sensors 12A-12N have a small enough feature that responds to high resolution pixel intensity change. The following describes some example shapes, sizes, and orientations of the pixels of sensors 12A-12N so that the coverage area captured by corresponding pixels (e.g., pixels located in the same position in sensors 12A-12N) is different. With pixels such as the one described, the amount time needed to determine a $R^{-1}$ matrix may be drastically reduced from 3.3 hours, for example, to several seconds. Also, the R matrix may not be a singularity and invertible, while still providing magnification greater than 2.5×, which makes the R matrix immune to degeneracy. The R matrix may be determined once during manufacturing, and afterwards, processing units may use this R matrix for generating the high resolution image from the images generated from sensors 12A-12N.

Figure 3:
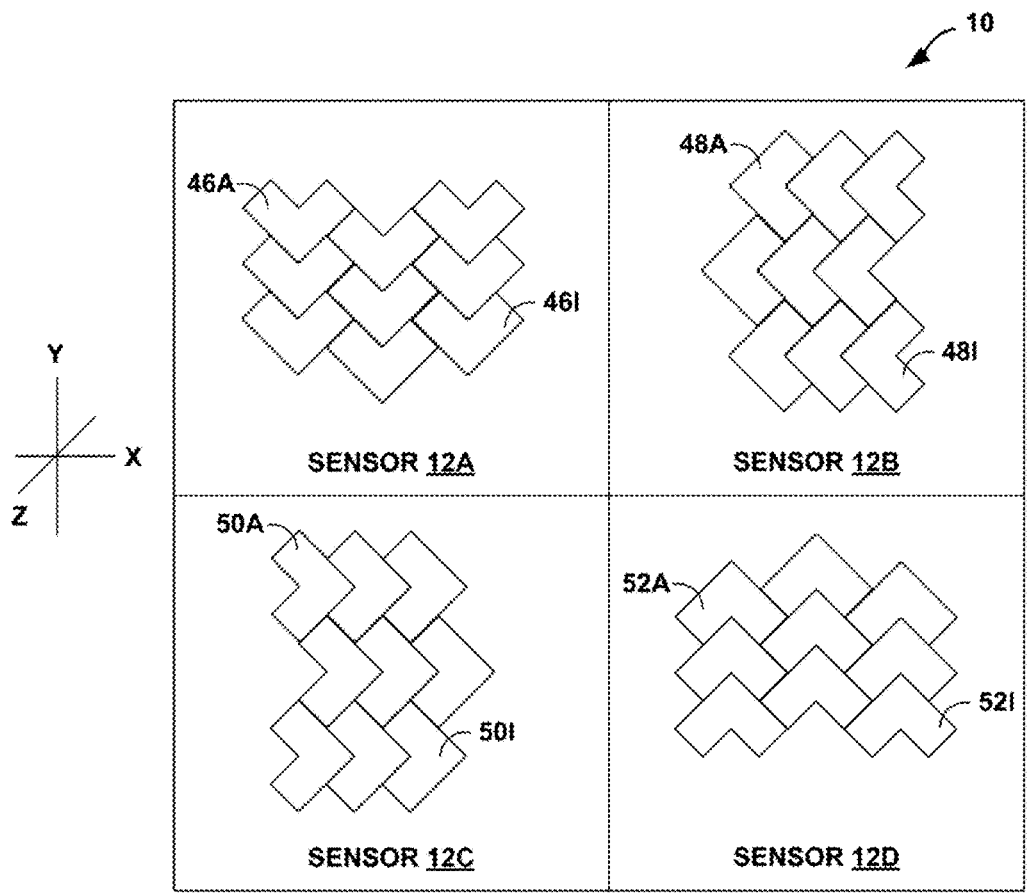
FIG. 3 is a structural diagram illustrating an example of pixels of sensors, in accordance with techniques described in this disclosure.

FIG. 3 is a structural diagram illustrating an example of pixels of sensors. FIG. 3 illustrates sensors 12A-12D of device 10, where each one of sensors 12A-12D includes a plurality of pixels (e.g., nine pixels) having different shapes, sizes, or orientation to promote differences in coverage areas between corresponding pixels of different sensors 12A-12D.

As illustrated in FIG. 3, sensor 12A includes pixels 46A-46I, sensor 12B includes pixels 48A-48I, sensor 12C includes pixels 50A-50I, and sensor 12D includes pixels 52A-52I. In this example, pixels 46A, 48A, 50A, and 52A all correspond with one another because each is located in a same relative position. In general, pixel 46A corresponds to pixels 48A, 50A, and 52A, pixel 46B corresponds to pixels 48B, 50B, and 52B, and so forth as each pixel is in the same location in respective sensors 12A-12D. For example, the plurality of pixels 46A-46I of sensor 12A includes a first pixel (e.g., pixel 46A). The plurality of pixels 48A-48I of sensor 12B includes a second pixel (e.g., pixel 48A). Pixel 48A is located in a same relative position in plurality of pixels 48A-48I of sensor 12B as pixel 46A in plurality of pixels 46A-46I of sensor 12A. In general, each of sensors 12A-12D includes respective pixel that corresponds with pixels in the other sensors 12A-12D.

In FIG. 3, pixels 46A-46I are interconnected to capture the entire image. The same is true for 48A-48I, 50A-50I, and 52A-52I. With interconnection of the pixels, as illustrated in FIG. 3, there is no gap (e.g., no light blanking) in the image content that is captured. Accordingly, the shape, size, or orientation of the plurality of pixels (e.g., 46A-46I) of sensor 12A configure the pixels of sensor 12A to interconnect with each other to achieve 100% fill factor (e.g., no gaps and no light blanking) of the image content to capture the entire image content. The shape, size, or orientation of pixels 48A-48I, 50A-50I, and 52A-52I of respective sensors 12B-12D similarly configure pixels 48A-48I, 50A-50I, and 52A-52I to interconnect with each other to achieve 100% fill factor of the image content to capture the entire image content. In such examples, none of the plurality of pixels of sensors 12A-12D includes a mask that reduces an amount of captured image content.

For instance, as illustrated, each one of pixels 46A-46I is formed as an L-shaped pixel. The same is true for pixels 48A-48I, 50A-50I, and 52A-52I. The L-shaped pixel may be formed by removing a portion of a square shaped pixel. Each of the L-shaped pixel interconnects with another L-shaped pixel such that there is still to no loss in the image content that is captured between pixels (e.g., interconnect to achieve 100% fill factor). In some cases, rather than removing a portion, it may be possible to mask off a portion. In such cases, no light is captured in the masked off portion meaning that there are gaps in the image content that is captured (e.g., not all of the image content is captured) by each one of sensors 12. With masking off the pixel, there is some loss of light as the masked off area is wasted space. However, by staggering or tiling the pixels, such as the L-shaped pixels tiled as illustrated in FIG. 3, there is no loss of light.

Each of the corresponding pixels (e.g., 46A, 48A, 50A, and 52A) differ from one another in at least one of shape, size, or orientation. For instance, FIG. 3 illustrates the example where the corresponding pixels differ in orientation. In the illustrated example, differing in orientation means that an orientation of each of pixels 48A-48I in sensor 12B is rotated (and possibly, not necessarily in-plane rotated) along an optical axis relative to an orientation of each of pixels 46A-46I in sensor 12A. The same is true for pixels 50A-50I and 52A-52I relative to pixels of any other sensors. For instance, the corresponding pixels of the different sensors 12A-12D have same shape but different orientation, such as different angles of rotation about an optical axis or normal.

An optical axis refers to the axis extending outward from sensors 12A-12D, in example of FIG. 3, and sensors 12 more generally. An optical axis is a line along which there is some degree of rotational symmetry in an optical system such as device 10 that includes sensors 12A-12D. The optical axis is an imaginary line that defines the path along which light propagates, as an approximation. In this disclosure, optical axis refers to the center of each of sensors 12A-12D. For example, sensor 12A includes an optical axis that extends from the center of sensor 12A outwards. This optical axis is normal to sensor 12A because the optical axis forms a 90-degree angle with sensor 12A. The other sensors 12 similarly include respective optical axes.

In the example illustrated in FIG. 3, the pixels of sensors 12A-12D lie in the x-y plane, and the z-axis extends outwards. Accordingly, the optical axes of respective sensors 12A-12D are parallel with the z-axis or any normal of the sensors 12A-12D and form a 90-degree angle with the x-y plane along which sensors 12A-12D reside.

If pixels 46A-46I were rotated clockwise 90 degrees along the optical axis of sensor 12A, then the result would be the orientation of pixels 48A-48I. For example, after rotation, pixel 46A would be in the same orientation as pixel 48C, pixel 46G would be in same orientation as pixel 48A, pixel 46C would be in the same orientation as pixel 48I, and pixel 46I would be in the same orientation as pixel 48G. Therefore, an orientation of each of the pixels 48A-48I in sensor 12B is rotated along an optical axis of sensor 12A relative to an orientation of each of the pixels 46A-46I in sensor 12A.

It should be understood that pixel 46A and 48A, 46C and 48C, 46G and 48G, and 46I and 48I all correspond to one another as they are in the same respective locations in respective sensors 12A and 12B. Because the orientation of pixels 46A-46I is the same and the orientation of pixels 48A-48I is the same, after rotation of pixels 46A-46I along the optical axis of sensor 12A, the orientation of pixel 46A is same as orientation of corresponding pixel 48A but rotated along an axis of pixel 46A.

If pixels 48A-48I were rotated clockwise 90 degrees along the optical axis of sensor 12B, then the result would be the orientation of pixels 52A-52I. For example, after rotation, pixel 48A would be in the same orientation as pixel 52C, pixel 48G would be in same orientation as pixel 52A, pixel 48C would be in the same orientation as pixel 52I, and pixel 48I would be in the same orientation as pixel 52G. Therefore, an orientation of each of the pixels 52A-52I in sensor 12D is rotated along an optical axis of sensor 12B relative to an orientation of each of the pixels 48A-48I in sensor 12B.

It should be understood that pixel 48A and 52A, 48C and 52C, 48G and 52G, and 48I and 52I all correspond to one another as they are in the same respective locations in respective sensors 12B and 12D. Because the orientation of pixels 48A-48I is the same and the orientation of pixels 52A-52I is the same, after rotation of pixels 48A-48I along the optical axis of sensor 12B, the orientation of pixel 48A is same as orientation of corresponding pixel 52A but rotated along an axis of pixel 48A.

If pixels 52A-52I were rotated clockwise 90 degrees along the optical axis of sensor 12D, then the result would be orientation of pixels 50A-50I. For example, after rotation, pixel 52A would be in the same orientation as pixel 50C, pixel 52G would be in same orientation as pixel 50A, pixel 52C would be in the same orientation as pixel 50I, and pixel 52I would be in the same orientation as pixel 50G. Therefore, an orientation of each of the pixels 50A-50I in sensor 12C is rotated along an optical axis of sensor 12D relative to an orientation of each of the pixels 52A-52I in sensor 12D.

It should be understood that pixel 52A and 50A, 52C and 50C, 52G and 50G, and 52I and 50I all correspond to one another as they are in the same respective locations in respective sensors 12D and 12C. Because the orientation of pixels 52A-52I is the same and the orientation of pixels 50A-50I is the same, after rotation of pixels 52A-52I along the optical axis of sensor 12D, the orientation of pixel 52A is same as orientation of corresponding pixel 50A but rotated along an axis of pixel 52A.

FIG. 3 illustrates an example where pixels 46A-46I of sensor 12A include L-shaped pixels and pixels 48A-48I of sensor 12B include L-shaped pixels. The L-shaped pixels of sensor 12A are rotated along an optical axis of sensor 12A relative to the L-shaped pixels of sensor 12B.

Although L-shaped pixels are illustrated in FIG. 3, the techniques are not so limited. In some examples, pixels shaped other than L-shaped may be possible. Even in such examples, the pixels of each of sensors 12 may have a similar shape (or different shape) and differ in orientations. For instance, pixels of one of sensors 12 may be rotated relative pixels of other sensors 12 as a way in which the orientations of the pixels differ.

Figure 4:
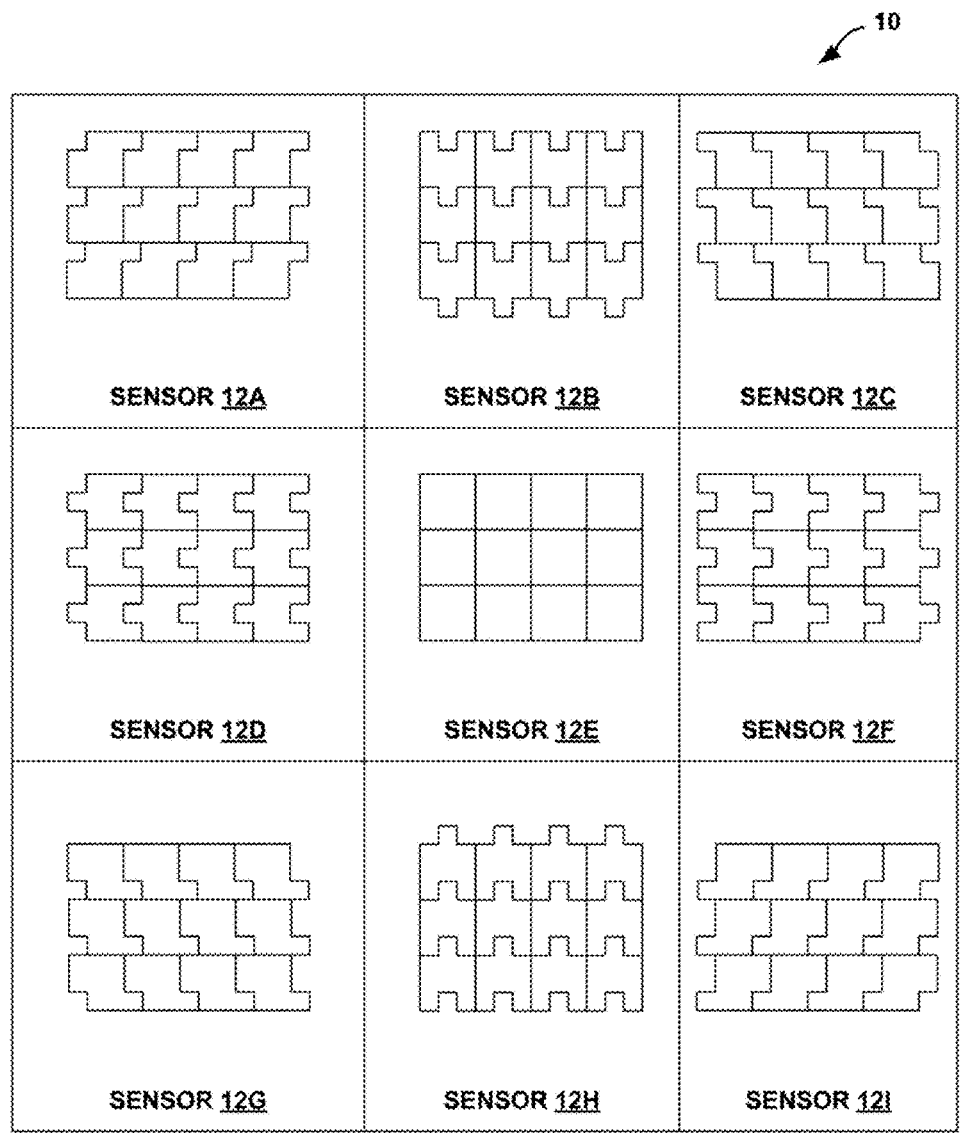
FIG. 4 is a structural diagram illustrating another example of pixels of sensors, in accordance with techniques described in this disclosure.

FIG. 4 is a structural diagram illustrating another example of pixels of sensors. For example, FIG. 4 illustrates the pixels of sensors 12A-12I, and each one of sensors 12A-12I includes twelve pixels (e.g., there are twelve pixels per sensor). Although twelve pixels are illustrated per sensor, there may be more or fewer pixels than twelve pixels per sensor.

Like FIG. 3, the pixels illustrated in each of sensors 12A-12I of FIG. 4 are interconnected to capture the entire image. With interconnection of the pixels, as illustrated in FIG. 4, there is no gap (e.g., no light blanking) in the image content that is captured. In the example illustrated in FIG. 4, the size, shape, and/or orientation of pixels for one of sensors 12A-12I (e.g., pixels of sensor 12A as illustrated in FIG. 4) is different than that for any of the other sensors 12A-12D (e.g., pixels of sensors 12B-12I illustrated in FIG. 4). For example, the shape of pixels in sensor 12A differs from the shape of pixels in any of sensors 12B-12I. In this example, sensor 12A includes a pixel having a corresponding pixel in each one of sensors 12B-12I (e.g., located in a same relative position in respective sensors). Each of these corresponding pixels differs from one another in shape in the example illustrated in FIG. 4, whereas in FIG. 3 the pixels differed in orientation. The pixels may similarly differ in size.

Accordingly, the shape, size, or orientation of the plurality of pixels of a first sensor of sensors 12A-12I configure the pixels of the first sensor to interconnect with each other to achieve 100% fill factor (e.g., no gaps and light blanking) of the image content to capture the entire image content. The shape, size, or orientation of pixels, as illustrated, of respective sensors 12A-12I similarly configure pixels to interconnect with each other to achieve 100% fill factor of the image content to capture the entire image content. In such examples, none of the plurality of pixels of sensors 12A-12I includes a mask that reduces an amount of captured image content.

FIGS. 3 and 4 illustrate different example ways in which to construct pixels for sensors 12A-12N. In each of these examples, the coverage area of any one pixel in one of sensors 12A-12N is different than the coverage area of any other corresponding pixel in the other sensors 12A-12N.

The following uses FIG. 3 as an illustrative example, with the understanding that the example is applicable to the example in FIG. 4. Pixel 46A is asymmetric relative to pixels 48A, 50A, and 52A in that if pixel 46A were side-by-side with any of pixels 48A, 50A, and 52A, pixel 46A would not be a copy of any of these pixels. It is guaranteed that even if pixel 46A and pixels 48A, 50A, and 52A were capturing the exact same region, that there would not be full overlap in the image content generated from the region captured by these pixels. Therefore, the coverage area of pixels 46A, 48A, 50, and 52A is different.

For example, if pixels 46A and 48A were to capture the exact same image region, then there is a portion at the top of pixel 46A where pixel 46A would not receive any light because that portion is removed but that portion exists on pixel 48A. However, there is a portion at the right of pixel 48A where pixel 48A would not receive any light because that portion is removed but that portion exists on pixel 46A.

In FIG. 3, pixels 46 of sensor 12A include pixels having a square shape with a portion removed from a first corner (e.g., top corner), and pixels 48 of the sensor 12B include pixels having the same square shape with a portion removed from a second corner (e.g., right corner) at a position different than a position of the first corner on pixels 46 of sensor 12A. The same applies for pixels 50 (left corner) and 52 (bottom corner). In FIG. 3, pixels 46, 48, 50, and 52 are all rotated along respective optical axes of sensors 12A-12D relative to one another.

Figure 5:
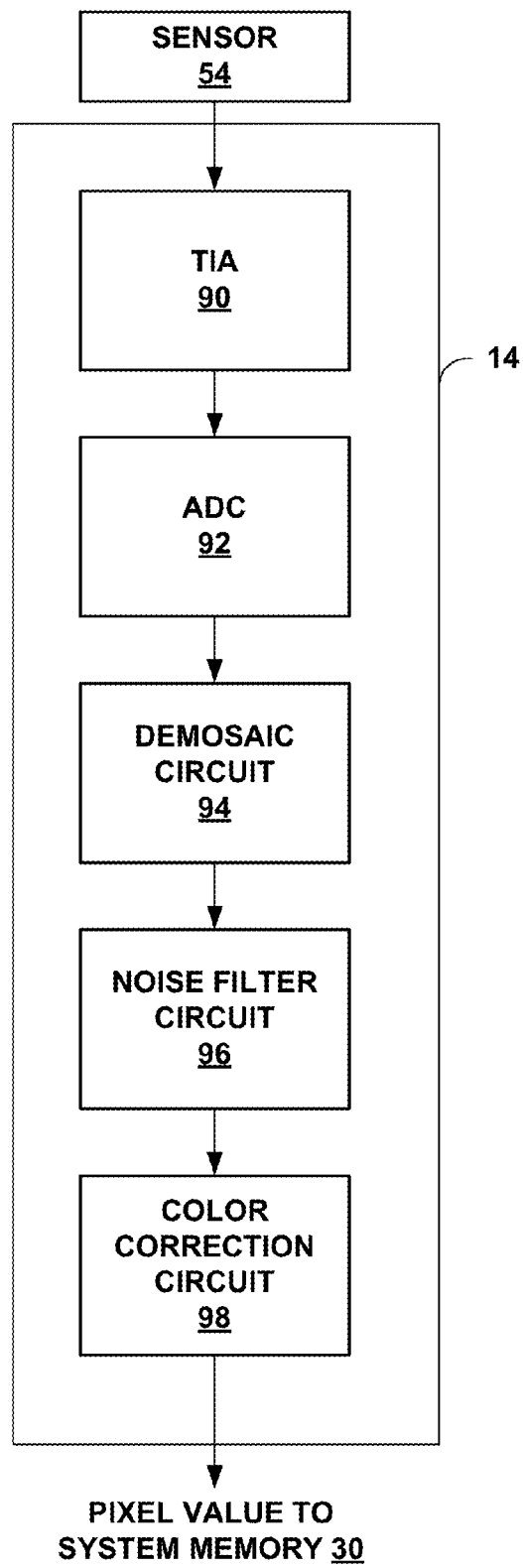
FIG. 5 is a block diagram illustrating an example of a sensor processor, in accordance with techniques described in this disclosure.

FIG. 5 is a block diagram illustrating an example of a sensor processor. For example, FIG. 5 illustrates an example of sensor processor 14 receiving current from pixel 54. Pixel 54 is an example of any of the pixels illustrated in FIGS. 3 and 4. Although on pixel 54 is illustrated, sensor processor 14 may include similar circuitry components for processing each of the other pixels or each of the illustrated circuitry components may be configured to perform operations on a plurality of pixels in parallel.

FIG. 5 illustrates example operations that sensor processor 14 may perform to process the image pixel data. Some of the example operations are optional and some of the example operations may be performed by components other than sensor processor 14. TIA 90 receives the current from pixel 54 and converts the current into a voltage. In some examples, TIA 90 may be an automatic gain control (AGCs) based TIAs so that the output of TIA 90 is an analog voltage.

Analog-to-digital converter (ADC) 92 converts the respective analog voltages into respective digital voltage values. Demosaic circuit 94 receives the output of ADC 92. Although demosaic circuit 94 is illustrated as receiving the digital values for only one pixel, the examples are not so limited. In some examples, demosaic circuit 94 receives the digital values resulting from the current generated from one or more of pixels. Demosaic circuit 94 implements the operations of a demosaicing algorithm to produce the correct color and brightness for a pixel based on the digital values for neighboring pixels.

Noise filter circuit 96 reduces noise in the color values for the pixels using any of a various filtering techniques. Color correction circuit 98 performs some additional correction to remove fuzziness between pixels to soften the image, but sharpen edges and contours. Sensor processor 14 may output the resulting values, which may be part of an overall pixel value (e.g., the red component of the RGB value), to system memory 30 for storage and further processing such as combining to form a high resolution image.

Although FIG. 5 illustrates demosaic circuit 94, noise filter circuit 96, and color correction circuit 98, in some examples, sensor processor 14 or some other processing circuit may first combine the lower resolution images to generate a high resolution image. Sensor processor 14 or the other processing unit may perform demosaicing, noise filtering, and color correction on the higher resolution image. In some examples, sensor processor 14 may perform one or more of demosaicing, noise filtering, and color correction on the lower resolution images, and perform any remaining functions on the higher resolution image.

In the above example, sensor processor 14 constructed the first and second image. However, in some examples, there may be a plurality of sensor processors like sensor processor 14, one for each one of sensors 12A-12N. Accordingly, the example techniques may be performed by one or more sensor processors like sensor processor 14.

Figure 6:
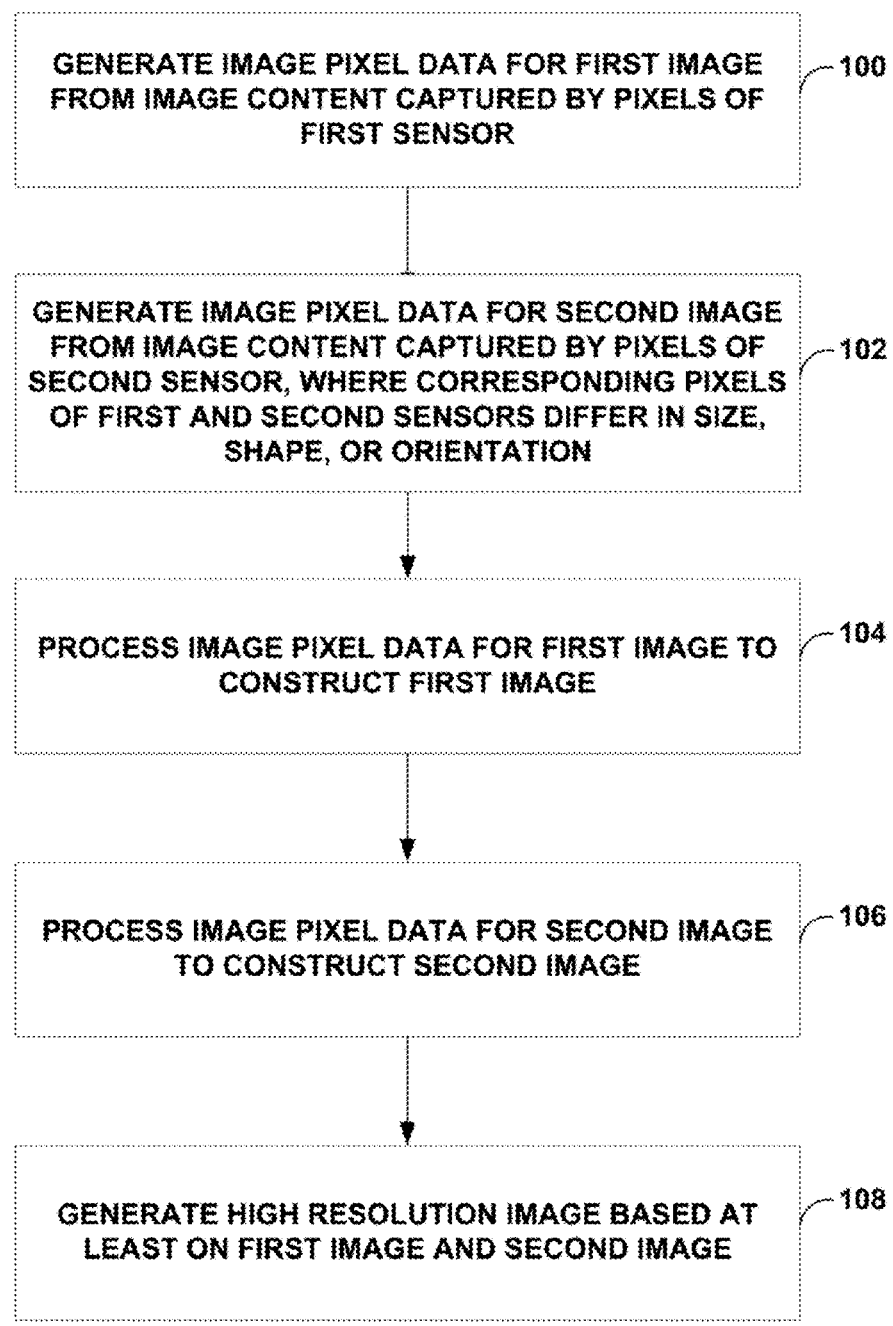
FIG. 6 is a flowchart illustrating an example method of image processing, in accordance with techniques described in this disclosure.

FIG. 6 is a flowchart illustrating an example method of image processing. In some examples, the algorithm illustrated in FIG. 6 occurs in response to a user interacting with device 10 to take a picture, such as to generate a high resolution image. For ease of description, FIG. 6 is described with respect to FIG. 3. As described above, in FIG. 3, sensors 12A-12D include L-shaped pixels. For instance, pixels 46 of sensor 12A include pixels having a square shape with a portion removed from a first corner (e.g., top corner), and pixels 48 of the sensor 12B include pixels having the same square shape with a portion removed from a second corner (e.g., right corner) at a position different than a position of the first corner on pixels 46 of sensor 12A.

In response to receiving light, sensor 12A may generate image pixel data (e.g., analog currents) for a first image from image content captured by pixels 46 of first sensor 12A (100). Similarly, in response to receiving light, sensor 12B may generate image pixel data (e.g., analog currents) for a second image from image content captured by pixels 48 of second sensor 12B (102).

A pixel of pixels 48 is located in a same relative position in pixels 48 of sensor 12B as a pixel in pixels 46 of sensor 12A (e.g., these pixels are corresponding pixels). Also, these pixels differ from one another in at least one of shape, size, or orientation. For instance, at least one of shape, size, or orientation of pixels 46 of sensor 12A is different than shape, size, or orientation of corresponding pixels of sensor 12B. The shape, size, or orientation of the plurality of pixels 46 of sensor 12A configure pixels 46 of sensor 12A to interconnect with each other to achieve 100% fill factor of the image content to capture the entire image content. The shape, size, or orientation of the plurality of pixels 48 of sensor 12B configure the pixels 48 of sensor 12B to interconnect with each other to achieve 100% fill factor of the image content to capture the entire image content.

This difference in the shape, size, or orientation of pixels 46 and 48 ensures, at the time of manufacture, that the image content used to generate R matrix will not result in the R matrix having the same row (e.g., there was not complete overlap in the image pixels) so that the R matrix is invertible and immune to degeneracy. This may allow for multiple (e.g., two, three, four or more), images to be combined and provide a magnification greater than 2.5× in generating the high resolution image.

One or more sensor processors (e.g., like sensor processor 14) may process the image pixel data for the first image to construct the first image (104), and may process the image pixel data for the second image to construct the second image (106). For example, the one or more sensor processors may convert the analog current into an analog voltage, convert the analog voltage into a digital value, and perform filtering such as demosaicing, noise filtering, and color correction to generate pixel values for the image pixels of the first and second images. By generating the pixel values for the image pixels of the first and second images, the one or more sensor processors may be considered as constructing the first and second images.

Although the above example is described with respect to a first image and a second image the example techniques are not so limited. In general, sensors 12A-12D may generate image pixel data for a plurality of images from image content captured by a plurality of pixels 46, 48, 50, and 52 of respective sensors 12A-12D, where the coverage areas of pixels in each of sensors 12A-12D are different than coverage areas of pixels in any of the other sensors 12A-12D. For example, each pixel in sensors 12C and 12D that is positioned in a same relative position as the corresponding pixel of sensor 12A and sensor 12B differs in at least one of size, shape, or orientation. One or more sensor processors may process the image pixel data from the plurality of images to construct the plurality of images. This example was described with respect to 2×2 (i.e., four sensors), but is extendable to the examples with 3×3 (i.e., nine sensors) such as in FIG. 4.

A processing circuit (e.g., sensor processor 14, CPU 16, GPU 18, display interface 26, or an external device) may generate a high resolution image based at least on the first image and the second image (108). The high resolution includes more image pixels than the first image and the second image. The processing circuit may arrange the image pixel values of the first image and the second image in a column to form an I vector. The processing circuit may multiply the I vector with $R^{-1}$ matrix to generate the image pixel values of high resolution image. System memory 30 may store the R or $R^{-1}$ matrix, or the processing circuit may store the R or $R^{-1}$ matrix in its local memory.

In some examples, multiplying $R^{-1}$ by I may not be feasible. In such examples, the processing circuit may use an iterative process to determine the values of x that makes the equation I=Rx true. For example, the processing circuit may have determined the vector I and may retrieve the R-matrix. The processing circuit may assume a value for x, and perform the matrix multiplication of R*x to determine if the result equals I. If the result does not equal I, the processing circuit may modify the value of x and repeat this process until the processing circuit identifies a value of x that makes the equation I=Rx true. Here, the value of x is the image pixel values for the high resolution image.

The following describes some results from examples of techniques described in this disclosure. In the following, it was assumed that the optics have a point spread function (PSF) of a square with the size of a high resolution image pixel. However, with this PSF, there is a small chance that the bright spot falls onto the black mask; so there a loss of information. Also, the PSF, may not be square.

The intrinsic parameters of sensors 12A-12N may be:

| Resolution | Pixel size | Focal length | Distortion |
|---|---|---|---|
| 40 × 30 | 100 um | 10.2 mm | [0.03, 0.003, 0.003, 0.0003] |

The extrinsic parameters of sensors 12A-12N may be:

|  | X | Y | Z | Rotation |
|---|---|---|---|---|
| Sensor 12A | −2.025 mm | −1.525 | 0 | 5 degrees along [0 0 1] |
| Sensor 12B | 2.025 mm | −1.525 | 0 | −2 degrees along [0 0 1] |
| Sensor 12C | −2.025 mm | 1.525 | 0 | 2 degrees along [0 0 1] |
| Sensor 12D | 2.025 mm | 1.525 | 0 | 2 degrees along [0 0.001 1] |

For the calibration of the light source, a 90×70 array is located at [0 0 200]. The separation between each pixel is 1. So the angle is 1/200. This is slightly larger than two times (2×) the sensor pixel angular separation (the focal length is 10.2 mm not 10 mm), this is to ensure R is full row rank. For testing, more pixels than those in the high resolution image were put to ensure all the sensor pixels of sensors 12A-12N are illuminated. The extra pixels will be removed when conditioning the R matrix. In practice the physical panel does not have to be put at 200 meters, and imaging optics can be used to put the image at 200 meter, if desired.

The resulting R-matrix may be very sparse. As a 4800× 6300 matrix, it has only 36,921 non-zero elements. Each column has at most sixteen non-zero elements. The summation of element along column direction gives values between 0 to 4. To further improve matrix condition, any columns whose value sum to less than two may be removed. Because there are more light source pixels than high resolution image pixels, summation along row direction gives approximately the value of 3. Here, every pixel in sensors 12A-12N is illuminated.

After conditioning, R has minimal singular value of 0.01, and a condition number of 300. The inversed matrix $R^{-1}$ may no longer be sparse. However, there may be ways to make sure the matrix $R^{-1}$ is spare and well-conditioned.

Generally, the inverse of a sparse matrix is not sparse, but in this case, it is because the error propagation distance L is limited. For any pixel k in the high resolution image, a smaller image size (2L+1)×(2L+1) with pixel k in the center can be defined. The matrix in this subspace is inverted by picking out only the rows and columns corresponding to those pixels. One row of this smaller matrix has only (2L+1)×(2L+1) elements at most. This row is used as the row for pixel k in the complete $R^{-1}$ matrix. The windows on every high resolution image pixel is shifted until all rows of $R^{-1}$ are found. The total storage needed is (2L+1)×(2L+1)× frame size, so it is desirable to reduce L.

However, even if $R^{-1}$ is not sparse, the image pixel values for the high resolution image can be found from I=Rx. In this example, iteration may be needed. For example, a resulting value of x may be first assumed and the multiplication may be performed to determine the equation I=Rx holds true with the assumed value of x is accurate. If the equation does not hold, then another value of x is assumed, and this process is iterated until a value of x is found that holds the equation true, where the value of x is the image pixel values of the high resolution image.

In the above examples for generating the R-matrix, the examples were based on where the calibration panel is located. However, this location does not have to be constant, and can be moved further or nearer by proper optics. The R-matrix can be measured at different distances and stored for the different distances. This allows for "refocus" at different distances by applying different R-matrices.

Also, each one of sensors 12A-12N is still a normal sensor. Accordingly, other processes associated with multi-sensor techniques may still be sued to information such as depth estimate or stereo image, on a low resolution level.

Figure 7:
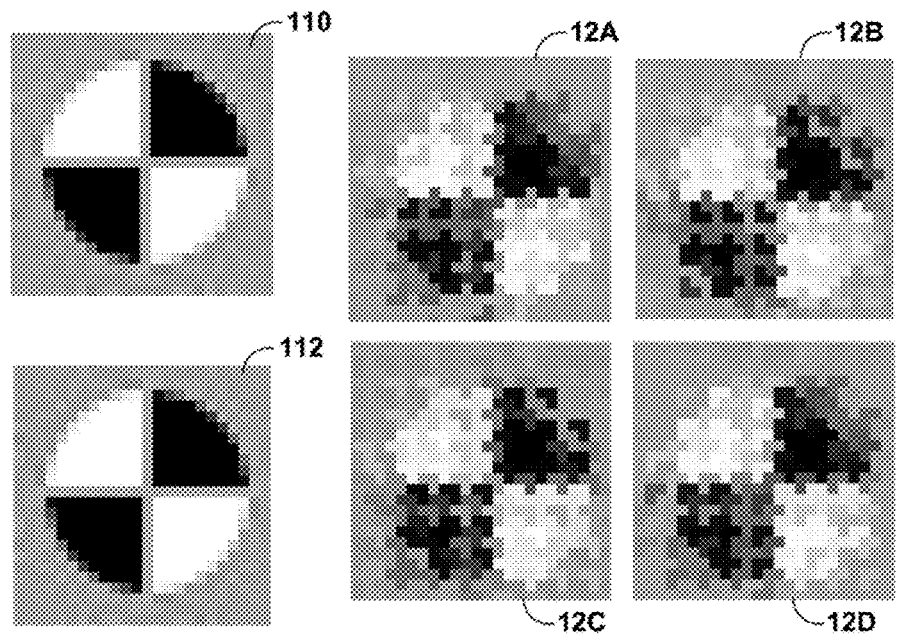
FIG. 7 is a pictorial diagram illustrating example results.

FIG. 7 is a pictorial diagram illustrating example results. The example illustrated in FIG. 7 is based on the example of sensors 12A-12D illustrated in FIG. 3. In FIG. 7, high resolution input image 110 is test image that includes more images pixels than pixels in any one of sensors 12A-12D. Pixels of sensors 12A-12D each receive pixel values of the image pixels of input image 110. Assume that image 110 includes four times as many image pixels as there are pixels in sensor 12A-12D. Therefore, each pixel of sensors 12A-12D would receive pixel values for three image pixels from image 110 due to the L-shape that would be averaged together. The result of the images generated by sensors 12A-12D are illustrated as images 114, 116, 118, and 120, respectively.

As illustrated, images 114, 116, 118, and 120 each generally form the shape of image 110, but at lower resolution. For understanding, the pixel shapes and orientations of pixels of sensors 12A-12D are illustrated in FIG. 7. In the techniques described in this disclosure, each corresponding pixel in sensors 12A-12D will have an overlapping area of two pixels in image 110. A pixel in any of sensors 12A-12D will have area of one pixel of image 110 that does not overlap with another one of sensors 12A-12D, but does overlap with the remaining ones of sensors 12A-12D.

Processing circuitry may combine the resulting images 114, 116, 118, and 120 to generate high resolution image 112. Image 112 is approximately a complete reconstruction of image 110. Accordingly, FIG. 7 illustrates that the example techniques of using corresponding pixels on sensors 12A-12N with different size, shape, and/or orientation can be used to construct high resolution images.

Figure 8:
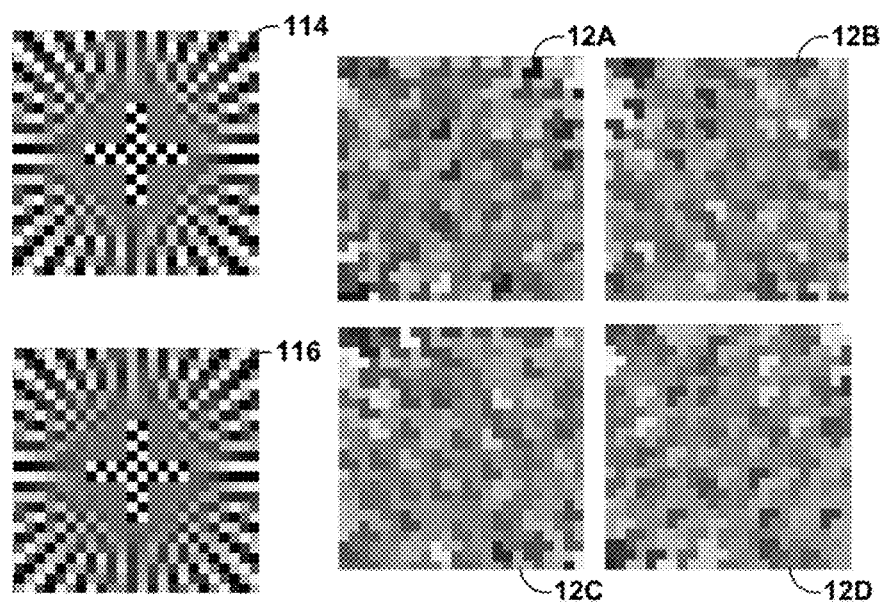
FIG. 8 is another pictorial diagram illustrating example results.

FIG. 8 is another pictorial diagrams illustrating example results. Like FIG. 7, the example illustrated in FIG. 8 is based on the example of sensors 12A-12D illustrated in FIG. 3. In FIG. 8, high resolution input image 122 is test image that includes more images pixels than pixels in any one of sensors 12A-12D. Pixels of sensors 12A-12D each receive pixel values of the image pixels of input image 122. Assume that image 122 includes four times as many image pixels as there are pixels in sensor 12A-12D. Therefore, each pixel of sensors 12A-12D would receive pixel values for three image pixels from image 122 due to the L-shape that would be averaged together. The result of the images generated by sensors 12A-12D are illustrated as images 126, 128, 130, and 132, respectively.

As illustrated, images 126, 128, 130, and 132 each generally form the shape of image 122, but at lower resolution. For understanding, the pixel shapes and orientations of pixels of sensors 12A-12D are illustrated in FIG. 8. In the techniques described in this disclosure, each corresponding pixel in sensors 12A-12D will have an overlapping area of two pixels in image 122. A pixel in any of sensors 12A-12D will have area of one pixel of image 122 that does not overlap with another one of sensors 12A-12D, but does overlap with the remaining ones of sensors 12A-12D.

Processing circuitry may combine the resulting images 126, 128, 130, and 132 to generate high resolution image 124. Image 124 is approximately a complete reconstruction of image 122. Accordingly, FIG. 8 illustrates that the example techniques of using corresponding pixels on sensors 12A-12N with different size, shape, and/or orientation can be used to construct high resolution images.

Figure 9:
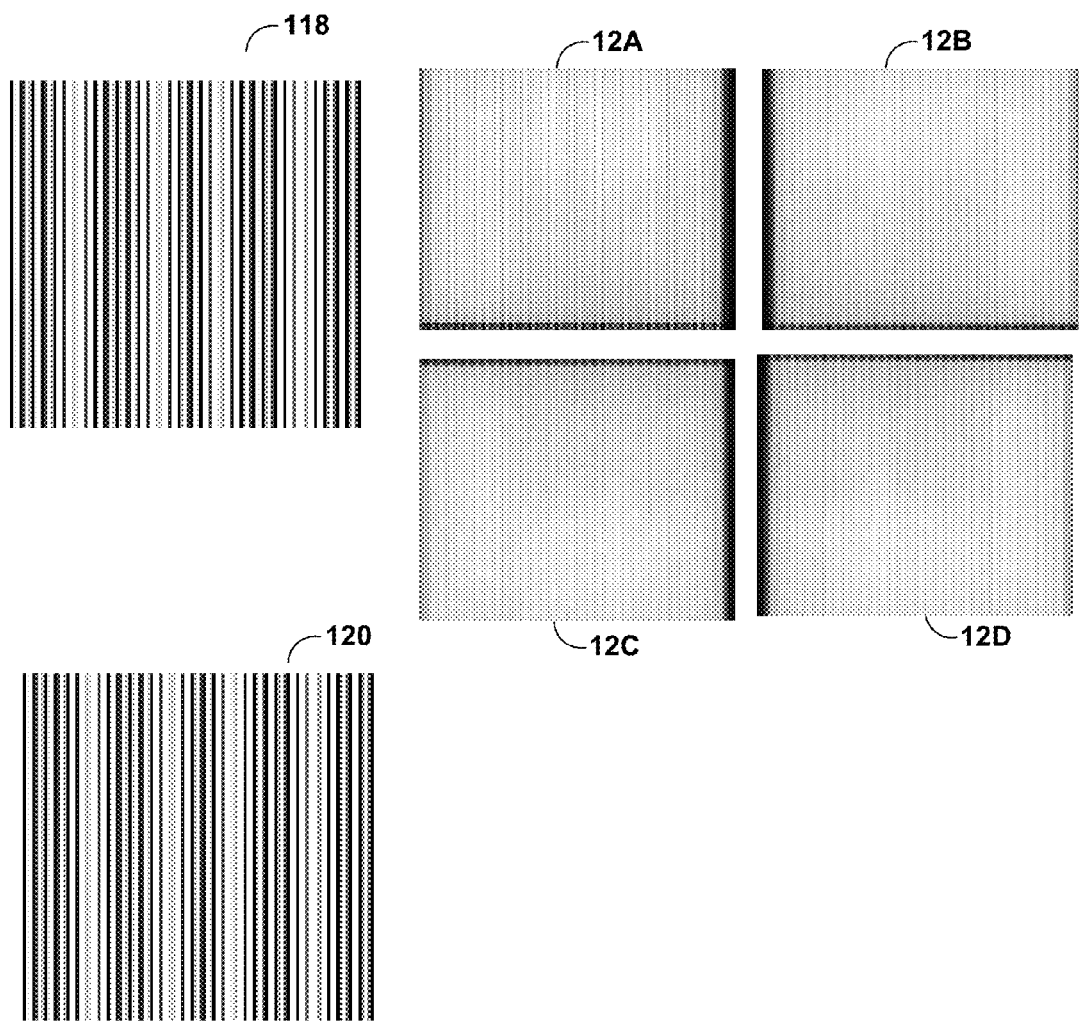
FIG. 9 is another pictorial diagram illustrating example results.

FIG. 9 is another pictorial diagram illustrating example results. Like FIGS. 7 and 8, the example illustrated in FIG. 9 is based on the example of sensors 12A-12D illustrated in FIG. 3. In FIG. 9, high resolution input image 134 is test image that includes more images pixels than pixels in any one of sensors 12A-12D. Pixels of sensors 12A-12D each receive pixel values of the image pixels of input image 134. Assume that image 134 includes four times as many image pixels as there are pixels in sensor 12A-12D. Therefore, each pixel of sensors 12A-12D would receive pixel values for three image pixels from image 134 due to the L-shape that would be averaged together. The result of the images generated by sensors 12A-12D are illustrated as images 138, 140, 142, and 144, respectively.

As illustrated, images 138, 140, 142, and 144 each generally form the shape of image 134, but at lower resolution. In the techniques described in this disclosure, each corresponding pixel in sensors 12A-12D will have an overlapping area of two pixels in image 134. A pixel in any of sensors 12A-12D will have area of one pixel of image 134 that does not overlap with another one of sensors 12A-12D, but does overlap with the remaining ones of sensors 12A-12D.

Processing circuitry may combine the resulting images 138, 140, 142, and 144 to generate high resolution image 136. Image 136 is approximately a complete reconstruction of image 134. Accordingly, FIG. 9 illustrates that the example techniques of using corresponding pixels on sensors 12A-12N with different size, shape, and/or orientation can be used to construct high resolution images.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising:
generating pixel data for a first image from image content captured by a first plurality of pixels of a first sensor;
generating pixel data for a second image from image content captured by a second plurality of pixels of a second sensor, wherein
each pixel of the first plurality of pixels corresponds to a pixel in the second plurality of pixels, wherein image content of each pixel of the first plurality of pixels overlaps with image content of the corresponding pixel in the second plurality of pixels, wherein each pixel covers a different area in the first sensor than its corresponding pixel covers in the second sensor, wherein each pixel and its corresponding pixel are relatively rotated about an axis normal to the pixels, and wherein each pixel of the first plurality of sensors and each pixel in the second plurality of sensors have the same shape;
processing the pixel data for the first image to construct the first image;
processing the pixel data for the second image to construct the second image; and
generating a high resolution image based on the first image and the second image.

2. The method of claim 1,
wherein the high resolution image includes more image pixels than image pixels in either of the first image or the second image.

3. The method of claim 2, wherein the high resolution image includes more than 2.5 times a number of image pixels in the first image or the second image.

4. The method of claim 1, wherein the first plurality of pixels interconnect with each other to achieve 100% fill factor of the image content to capture the entire image content, and wherein the second plurality of pixels interconnect with each other to achieve 100% fill factor of the image content to capture the entire image content.

5. The method of claim 1, wherein none of the plurality of pixels of the first sensor and second sensor includes a mask that reduces an amount of captured image content.

6. The method of claim 1, further comprising:
generating pixel data for a plurality of additional images from image content captured by a plurality of pixels of one or more additional sensors, wherein the plurality of pixels of the one or more additional sensors differ from corresponding pixels of the first sensor and corresponding pixels of the second sensor in at least one of shape, size, or orientation; and
processing the pixel data from the plurality of additional images to construct the plurality of additional images.

7. The method of claim 1, wherein the pixels of the first sensor comprise L-shaped pixels, and the pixels of the second sensor comprise L-shaped pixels, and wherein a pixel is L-shaped when a shape of the pixel comprises a square with a portion removed from a corner of the square.

8. A device for image processing, the device comprising:
a first sensor comprising a first plurality of pixels, the first sensor configured to generate pixel data for a first image from image content captured by the first plurality of pixels of the first sensor;
a second sensor comprising a second plurality of pixels, the second sensor configured to generate pixel data for a second image from image content captured by the second plurality of pixels of a second sensor, wherein
each pixel of the first plurality of pixels corresponds to a pixel in the second plurality of pixels, wherein image content of each pixel of the first plurality of pixels overlaps with image content of the corresponding pixel in the second plurality of pixels, wherein each pixel covers a different area in the first sensor than its corresponding pixel covers in the second sensor, wherein each pixel and its corresponding pixel are relatively rotated about an axis normal to the pixels, and wherein each pixel of the first plurality of sensors and each pixel in the second plurality of sensors have the same shape; and
one or more sensor processors configured to:
process the pixel data for the first image to construct the first image;
process the pixel data for the second image to construct the second image; and
generate a high resolution image based at least on the first image and the second image.

9. The device of claim 8,
wherein the high resolution image includes more image pixels than image pixels in either of the first image or the second image.

10. The device of claim 9, wherein the high resolution image includes more than 2.5 times a number of image pixels in the first image or the second image.

11. The device of claim 8, wherein the first plurality of pixels interconnect with each other to achieve 100% fill factor of the image content to capture the entire image content, and wherein the second plurality of pixels interconnect with each other to achieve 100% fill factor of the image content to capture the entire image content.

12. The device of claim 8, wherein none of the plurality of pixels of the first sensor and second sensor includes a mask that reduces an amount of captured image content.

13. The device of claim 8, further comprising:
one or more additional sensors each comprising a plurality of pixels, the one or more additional sensors configured to generate pixel data for a plurality of additional images from image content captured by the plurality of pixels of the one or more additional sensors, wherein the plurality of pixels of the one or more additional sensors differ from corresponding pixels of the first sensor and corresponding pixels of the second sensor in at least one of shape, size, or orientation,
wherein the one or more sensor processors are configured to:
process the pixel data from the plurality of additional images to construct the plurality of additional images.

14. The device of claim 8, wherein the pixels of the first sensor comprise L-shaped pixels, and the pixels of the second sensor comprise L-shaped pixels, and wherein a pixel is L-shaped when a shape of the pixel comprises a square with a portion removed from a corner of the square.

15. The device of claim 8, wherein the device comprises one of:
a wireless communication device, a mobile telephone, a laptop, a desktop, a tablet computer, or a sensor device.

16. A device for image processing, the device comprising:
a first means for generating pixel data for a first image from image content captured by a first plurality of pixels of the first means for generating;
a second means for generating pixel data for a second image from image content captured by a second plurality of pixels of the second means for generating, wherein
each pixel of the first plurality of pixels corresponds to a pixel in the second plurality of pixels, wherein image content of each pixel of the first plurality of pixels overlaps with image content of the corresponding pixel in the second plurality of pixels, wherein each pixel covers a different area in the first sensor than its corresponding pixel covers in the second sensor, wherein each pixel and its corresponding pixel are relatively rotated about an axis normal to the pixels, and wherein each pixel of the first plurality of sensors and each pixel in the second plurality of sensors have the same shape; and
means for processing the pixel data for the first image to construct the first image;
means for processing the pixel data for the second image to construct the second image; and
means for generating a high resolution image based at least on the first image and the second image.

17. The device of claim 16,
wherein the high resolution image includes more image pixels than image pixels in either of the first image or the second image.

18. The device of claim 16, wherein none of the plurality of pixels of the first sensor and second sensor includes a mask that reduces an amount of captured image content.

19. A computer-readable storage medium having instructions stored thereon that when executed cause one or more processors of a device for image processing to:
generate pixel data for a first image from image content captured by a first plurality of pixels of a first sensor;
generate pixel data for a second image from image content captured by a second plurality of pixels of a second sensor, wherein
each pixel of the first plurality of pixels corresponds to a pixel in the second plurality of pixels, wherein image content of each pixel of the first plurality of pixels overlaps with image content of the corresponding pixel in the second plurality of pixels, wherein each pixel covers a different area in the first sensor than its corresponding pixel covers in the second sensor, wherein each pixel and its corresponding pixel are relatively rotated about an axis normal to the pixels, and wherein each pixel of the first plurality of sensors and each pixel in the second plurality of sensors have the same shape; and process the pixel data for the first image to construct the first image;

process the pixel data for the second image to construct the second image; and generate a high resolution image based at least on the first image and the second image.

* * * * *